United States Patent [19]

Nakamura et al.

[11] Patent Number: 5,309,440
[45] Date of Patent: May 3, 1994

[54] ISDN USER-NETWORK INTERFACE SYSTEM

[75] Inventors: Hajime Nakamura; Hiroyuki Kikuta, Tokyo; Fumio Watanabe, Tokyo; Masanobu Fujioka, Tokyo, all of Japan

[73] Assignee: Kokusai Denshin Denwa Kabushiki Kaisha, Tokyo, Japan

[21] Appl. No.: 940,040

[22] Filed: Sep. 3, 1992

[30] Foreign Application Priority Data

Sep. 6, 1991 [JP] Japan .................. 3-254193
Sep. 6, 1991 [JP] Japan .................. 3-254194
Sep. 6, 1991 [JP] Japan .................. 3-254195

[51] Int. Cl.$^5$ .............................................. H04J 3/06
[52] U.S. Cl. ........................... 370/105.1; 370/85.1; 370/94.1; 370/97; 370/110.1
[58] Field of Search ............ 370/85.1, 85.2, 85.3, 370/94.1, 100.1, 105.1, 110.1, 97

[56] References Cited

U.S. PATENT DOCUMENTS

| | | | |
|---|---|---|---|
| 4,722,082 | 1/1988 | Furuya et al. | 370/110.1 X |
| 4,792,800 | 12/1988 | Fujioka et al. | 370/85.1 X |
| 4,835,769 | 5/1989 | Donaghue, Jr. et al. | 370/85.1 |
| 4,837,788 | 6/1989 | Bird | 370/85.1 X |
| 4,935,923 | 6/1990 | Shimizu et al. | 370/110.1 X |
| 5,204,860 | 4/1993 | Sparks | 370/110.1 |

Primary Examiner—Douglas W. Olms
Assistant Examiner—Russell W. Blum
Attorney, Agent, or Firm—Emmanuel J. Lobato; Robert E. Burns

[57] ABSTRACT

An ISDN-user-network interface system comprising an interface buffer and an interface adapter. The interface buffer provided between an ISDN network terminal equipment and a terminal equipment to receive an up-signal frame transmitted from said terminal equipment to said network terminal equipment, to store said up-signal frame, and to transmit said stored up-signal frame at a timing when said network terminal equipment is capable of detecting the synchronization of said up-signal frame. The interface adapter provided between said ISDN network terminal equipment and said terminal equipment, to receive an up-signal frame transmitted from said terminal equipment to said network terminal equipment, to detect D-channel bits of said up-signal frame, to transmit said up-signal frame to said network terminal equipment, to copy said detected D-channel bits into echo channel bits of a down-signal frame from said net-work terminal equipment to said terminal equipment received immediately after the transmission of said up-signal frame, and to transmit said down-signal frame to said terminal equipment.

4 Claims, 15 Drawing Sheets

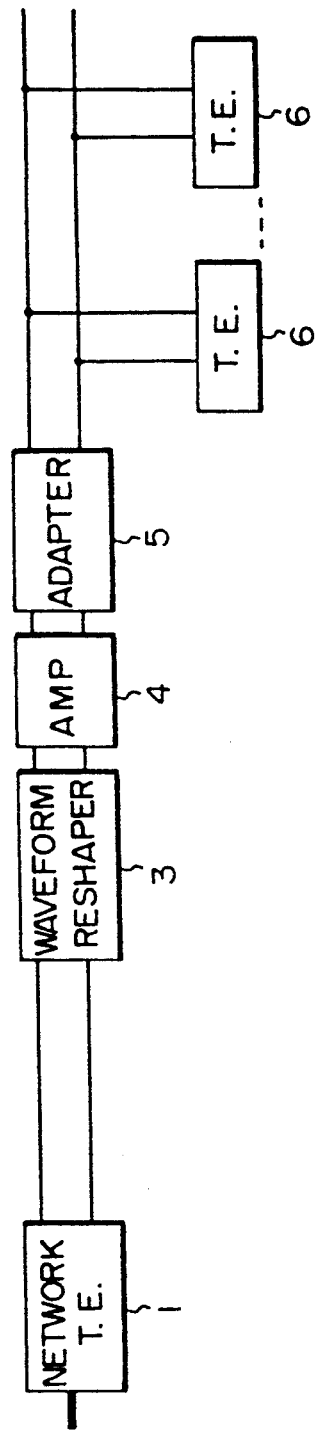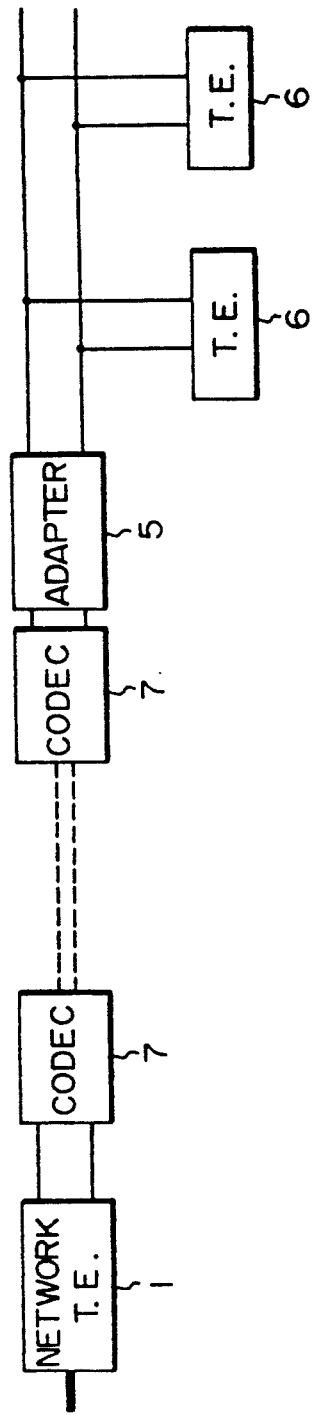

ISDN USER-NETWORK INTERFACE SYSTEM

BACKGROUND OF THE INVENTION

The present invention relates to an ISDN user-network interface system and, more particularly, to establishment of initial synchronization.

Interface between a network terminal equipment and a terminal equipment of the ISDN is defined by the CCITT Recommendation I.400 series, and the physical layer of the basic access interface is defined by Recommendation I.430. Recommendation I.430 defines the presence of a one-to-one connection and a one-to-n connection as operating modes and defines the following maximum operational distance and line configuration or arrangement models: (a) short passive bus of 100 to 200 meters (1:2 point-to-multipoint configuration), (b) extended passive bus of 500 to 1000 meters (1:2 point-to-multipoint configuration) and (c) point-to-point configuration of a maximum length of 1000 meters. With such line arrangement models, a transmission delay between a network terminal equipment and a terminal equipment, and a distortion of the signal waveform can be held within values defined by Recommendation I.430. Since the line arrangement models are defined to satisfy electrical characteristics between a terminal equipment and a network terminal equipment, however, it is also possible to employ other line configurations, if they satisfy the electrical characteristics.

Moreover, Recommendation I.430 defines access control described below in a case where a plurality of terminal equipments concurrently access an up-line D channel to a network terminal equipment in an operating mode in which a plurality of terminal equipments are connected to one bus. That is, only one of the terminal equipments is allowed to correctly complete transmission of its information, the other terminals once stop their access to the D channel and, when the channel becomes idle, try to access it, and ultimately all the terminal equipments complete transmission of their information in a sequential order. To effect such access control for the D channel, the network terminal equipment, upon receiving a signal frame (hereinafter refered as "up-signal frame") on an up line from a terminal equipment, copies D-channel bits in the up-signal frame into echo channel bits in a signal frame (hereinafter refered as "down-signal frame") which is transmitted on a down line to the terminal equipment next. Each terminal equipment observes the echo bits in its received down-signal frame and compares the D-channel bits in the transmitted signal frame with the echo channel bits in the received signal frame, thereby deciding the state of the up-line D channel for collision detection.

In a case where connections other than those of the line arrangement models defined by Recommendation I.430, such as the extension of the transmission line and encoding, are carried out between the network terminal equipment and the terminal equipment in the prior art, electrical characteristics between the network terminal equipment and the terminal equipment sometimes may not satisfy the defined values. Of the electrical characteristics defined by Recommendation I.430, deterioration of the signal waveform can satisfy the defined value through use of the existing techniques such as a waveform shaping circuit and an amplifier. As regards the transmission delay between the network terminal equipment and the terminal equipment, however, the defined value cannot be satisfied even by the use of the existing techniques, Yet it is premised that the network terminal equipment and the terminal equipment are used in an environment in which they satisfy the defined values of Recommendation I. 430, and their normal operation is not guaranteed under the environment in which the defined values are not satisfied.

That is, when the transmission delay between the network terminal equipment and each terminal equipment exceeds the defined value of Recommendation I.430, two problems arises. One problem is that synchronization of the up-signal frame transmitted from the terminal equipment cannot be established in the network terminal equipment. In general, the network terminal equipment is produced on the assumption that it is used under an environmental condition where the electrical characteristics satisfy the defined values of Recommendation I.430; hence, when a delay is larger than the defined value, it cannot be said that synchronization of the up-signal frame transmitted from the terminal equipment can always be detected correctly.

The other problem is that when the round trip delay time between the network terminal equipment and the terminal equipment is longer than 250 microseconds, the down-signal frame which is received in the terminal equipment immediately after the transmission therefrom of the up-signal frame differs from the down-signal frame transmitted from the network terminal equipment in response to the up-signal frame, that is, the up-signal frame and the down-signal frame do not correctly correspond to each other in the terminal equipment. If an interval from a time when the network terminal equipment transmitted the down-signal frame to a time when it receives the up-signal frame which is transmitted from the terminal equipment in response to the down-signal frame is longer than 250 microseconds, then the network terminal equipment will transmit the next signal frame before it receives the up-signal frame. Then the down-signal frame which the terminal equipment receives immediately after transmitting the up-signal frame is a down-signal frame already transmitted from the network terminal equipment prior to the reception of the up-signal frame. Accordingly, the echo channel bits in the down-signal frame received by the terminal equipment have copied thereinto the D-channel bits in the signal frame transmitted before the immediately preceding signal frame. When the D-channel bits and the echo channel bits in the signal frame do not correspond to each other in the terminal equipment, D-channel access control cannot be effected.

Because of the two problems mentioned above, it is impossible, with the prior art, to perform an extension of the transmission line or encoding which causes the transmission delay between the network terminal equipment and each terminal equipment to exceed the defined value of Recommendation I.430.

Furthermore, since the line extension which causes the round trip delay to be larger than the defined value of Recommendation I.430 is impossible between the network terminal equipment and each terminal equipment, passive buses, each having connected thereto a terminal unit, cannot be connected to each other. Hence it is impossible to connect a plurality of passive buses to one network terminal equipment to simultaneously connect thereto eight or more terminal equipments.

SUMMARY OF THE INVENTION

An object of the present invention is to provide an ISDN user-network interface system which ensures normal operation of a network terminal equipment and a terminal equipment even when the round trip delay is larger than the defined value, and which permits an extension of the transmission line between the network terminal equipment and the terminal equipment and an increase in the number of terminal equipments which can be connected to the transmission line at the same time.

To attain the above objective, the interface system of the present invention comprises a buffer and an adapter for the ISDN User-network interface.

The ISDN user-network interface buffer has its feature in that it stores therein between the terminal equipment and the network terminal equipment an up-signal frame transmitted from the terminal equipment and transmits the stored up-signal frame to the network terminal equipment for detecting the synchronization of the signal frames.

The ISDN user-network interface adapter has its feature in that it copies, between the terminal equipment and the network terminal equipment, the D-channel bits in the up-signal frame transmitted from the terminal equipment into the echo channel bits in the down-signal frame to be received by the terminal equipment next, regardless of the correspondence between transmitted and received signal frames.

With the use of the ISDN user-network interface buffer employed in the present invention, even in a case where a transmission delay occurs between the network terminal equipment and the terminal equipment and a delay in the input of the up-signal frame into the network terminal equipment exceeds the range defined by Recommendation I.430, the signal frame is stored in the buffer and is then transmitted therefrom so that the delay in the input into the network terminal equipment becomes equal to the sum total of the time for transmission of a plurality of frames and the round trip delay time defined by Recommendation I.430—this permits detection of synchronization of signal frame in the network terminal equipment.

Moreover, with the use of the ISDN user-network interface adapter employed in the present invention, even in a case where a transmission delay occurs between the network terminal equipment and the terminal equipment and the correspondence between transmitted and received signal frames in the terminal equipment is lost, the D-channel bits in the transmitted up-signal frame is copied into the echo channel bits in the down-signal frame to be received by the terminal equipment next. This ensures retaining the correspondence between the D-channel bits and the echo channel bits in the terminal equipment, and hence permits the D-channel access control.

Thus, the network terminal equipment and the terminal equipment can be interconnected even in a case where the transmission line is extended or a transmission delay is caused by encoding and the connection of passive buses.

BRIEF DESCRIPTION OF THE DRAWINGS

The present invention will be described in detail below with reference to accompanying drawings, in which:

FIG. 3 is a connection diagram of a network terminal equipment and terminal equipments in accordance with another embodiment of the present invention;

FIG. 4 is a connection diagram of a network terminal equipment and terminal equipments in accordance with another embodiment of the present invention;

DETAILED DESCRIPTION

Embodiment 1

Figure 1:
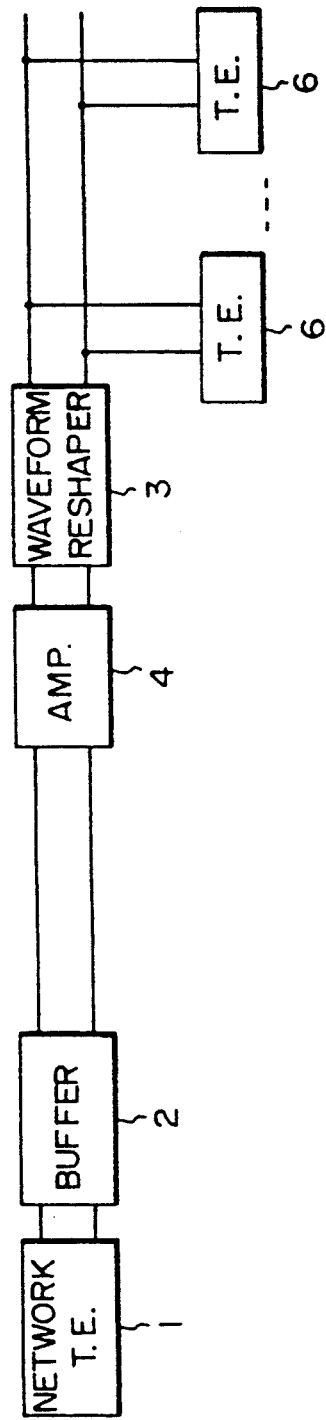
FIG. 1 is a connection diagram of a network terminal equipment and terminal equipments in accordance with an embodiment of the present invention.
Figure 2:
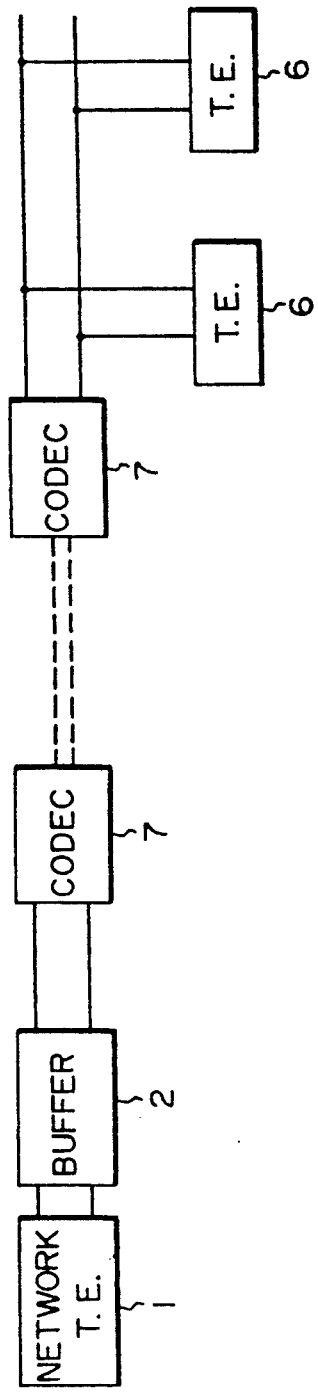
FIG. 2 is a connection diagram of a network terminal equipment and terminal equipments in accordance with another embodiment of the present invention.

FIGS. 1 and 2 are block diagrams illustrating a connection of a network terminal equipment and terminal equipments, which employ a buffer in accordance with the present invention. Reference numeral 1 indicates a network terminal equipment, 2 a buffer, 3 a waveform reshaping circuit, 4 an amplifier, 6 terminal equipments, and 7 codecs. They are interconnected by a four-wire transmission system, respectively. Now, let it be assumed that a distance between the network terminal equipment 1 and each terminal equipment 6 is longer than a distance defined by Recommendation I.430 and that a distance between the network terminal equipment 1 and the buffer 2 is a distance that holds the electrical characteristics defined by Recommendation I.430. In this instance, a distortion of the signal waveform and a round trip delay occur between the network terminal equipment 1 and the terminal equipment 6. The codecs 7 are each device which converts the signal aspect in accordance with the transmission line used and include a digital modem or the like as well. Assume that the use of the codecs 7 for encoding also causes a transmission delay larger than the defined value. In such a case, the distortion of the signal waveform can be suppressed to the defined value of Recommendation I.430 through utilization of the existing techniques such as the waveform reshaping circuit 3 and the amplifier 4. In contrast thereto, the transmission delay cannot be removed by the existing techniques, and hence a round trip delay in the network terminal equipment becomes larger than the defined value of Recommendation I.430, making it impossible to detect the synchronization of the up-signal frame. However, the use of the buffer 2 employed in the present invention permits the detection of synchronization of the up-signal frame in the network terminal equipment, 1.

Figure 6:
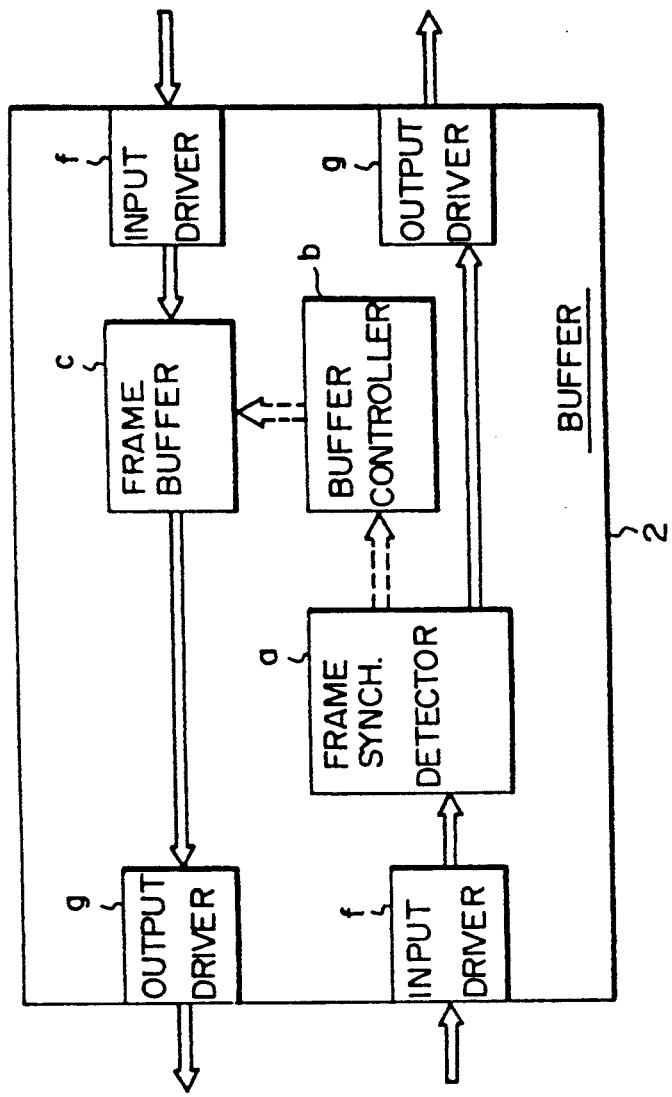
FIG. 6 is a block diagram of a buffer for use in the present invention.
Figure 8:
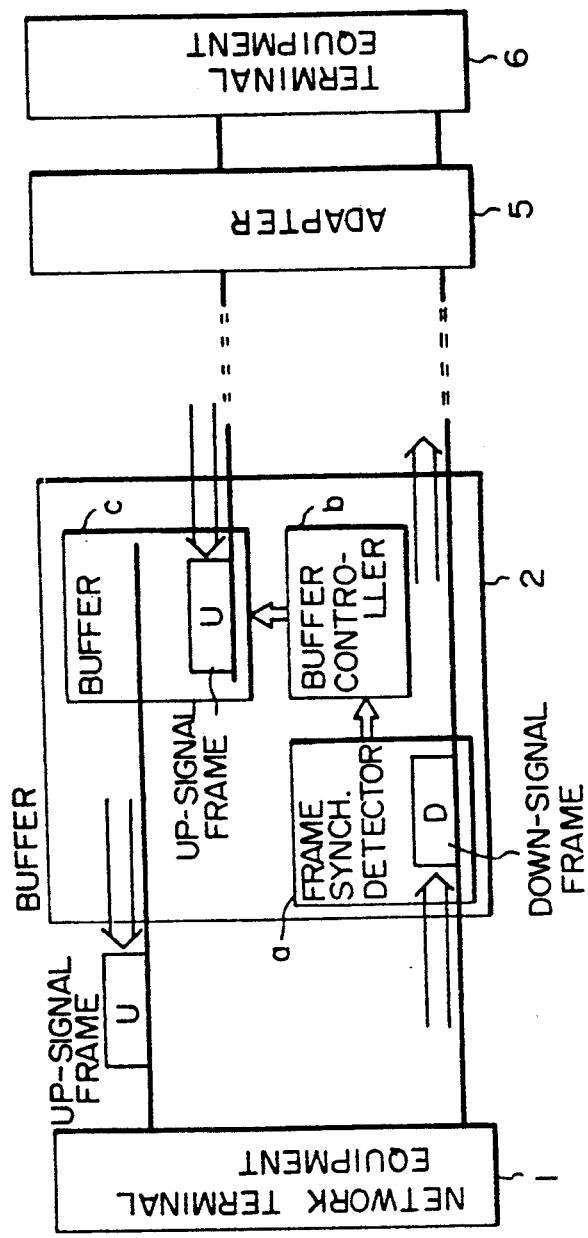
FIG. 8 is an operation diagram of the buffer for use in the present invention.

A description will be given of the functional block of the buffer 2 for use in the present invention and processing of each functional part. FIG. 6 is a functional block diagram of the buffer 2 and FIG. 8 its functional operation diagram. In FIG. 6, the buffer 2 comprises a frame synchronization detector a, a buffer controller b, a frame buffer c, input drivers f and output drivers g. In the buffer 2, the frame buffer c first stores an up-signal frame transmitted from the terminal equipment 6. Next, the frame synchronization detector a detects the synchronization of a down-signal frame from the network terminal equipment 1 and indicates the frame timing to the buffer controller b. The buffer controller b controls the frame buffer c to transmit the up-signal frame stored therein to the network terminal equipment 1 at two-bit offset timing with respect to the frame timing indicated from the frame synchronization detector a.

The above is the operation sequence of the buffer 2 according to the present invention. The following table 1 shows processing of signal frames between the network terminal equipment 1 and the terminal equipment 6 in a case where the buffer 2 is used.

TABLE 1

| Defined values of CCITT Recommendation I.430 | |
| --- | --- |
| Kind of network terminal equipment (line arrangement) | Round trip delay range (microsecond) |
| Network terminal equipment for passive bus | 10~14 |
| Network terminal equipment for one-to-one and passive bus (bus arrangement) | 10~13 |
| Network terminal equipment for one-to-one and passive bus (point-to-point) | 10~42 |
| Network terminal equipment for extended bus | 10~42 Transmission delay difference between terminal equipments |

Now, let it be assumed that a round trip delay in the network terminal equipment 1 is $t_1$ microseconds, a round trip delay in the buffer 2 is $t_2$ microseconds, a round trip delay in the network terminal equipment 1, defined by Recommendation I.430, ranges from $T_1$ to $T_2$ microseconds and the one-frame transmission time is 250 microseconds. The round trip delay herein mentioned is the time from the point of transmission of a down-signal frame to the point of reception of an up-signal frame corresponding to the transmitted down-signal frame. The range of the round trip delay in the network terminal equipment 1, prescribed by Recommendation I.430, is given above in Table 1. When the round trip delay is in the prescribed range, the network terminal equipment 1 is capable of detecting frame synchronization every 250 microseconds. That is, when $(T_1+(250*n)) \leq t_1 \leq (T_2+(250*n))$, the network terminal equipment 1 is capable of detecting the signal frame synchronization. Hence, when $T_2 < t_1 < (T_1+250)$, the network terminal equipment 1 cannot detect the signal frame synchronization, but when $(T_1+250) \leq t_1 \leq (T_2+250)$, the network terminal equipment 1 is allowed to detect the frame synchronization. Therefore, when the input delay time $t_1$ of an up-signal frame U1 is $T_2 < t_1 < (T_1+250)$, the signal frame U1 is stored in the buffer 2 and is then transmitted therefrom to the network terminal equipment 1 at such timing that the input delay time $t_1$ may be $(T_1+250) < t_1 < (T_2+250)$. This operation allows the network terminal equipment 1 to detect the synchronization of the up-signal frame U1. Since a distance between the network terminal equipment 1 and the buffer 2 is within the range of the prescribed value of Recommendation I.430, the round trip delay $t_1$ in the network terminal equipment 1 becomes $(T_1+250) \leq t_1 \leq (T_2+250)$ by transmitting from the buffer 2 the up-signal frame U1 at the two-bit offset timing with respect to a down-signal frame D2 which is transmitted from the network terminal equipment 1 after a down-signal frame D1. The same is true of the case where $t_1 > (T_2+250)$. In the case where the round trip delay time in the network terminal equipment 1 is longer than $(T_2+250)$ microseconds but shorter than $(T_1+250\times(n+1))$ microseconds, the round trip delay time can be put into a range between $(T_1+250\times(n+1))$ and $(T_2+250\times(n+2))$ microseconds by the use of the buffer 2.

With the use of the buffer 2 in the present invention, it is possible to detect the synchronization of received signal frames even when the round trip delay time in the network terminal equipment goes beyond the given limit.

Embodiment 2

FIGS. 3 and 4 are block diagrams illustrating the connection of network terminal equipment and terminal equipments which employ an adapter according to the present invention. Reference numeral 1 indicates network terminal equipment, 3 a waveform reshaping circuit, 4 an amplifier, 5 an adapter, 6 terminal equipments, and 7 codecs. They are interconnected by a four-wire transmission line, respectively. Now, let it be assumed that a distance between the network terminal equipment 1 and each terminal equipment 6 is longer than a distance prescribed by Recommendation I.430 and that a distance between the adapter 5 and the terminal equipment 6 is a distance that holds the electrical characteristics prescribed by Recommendation I.430. With such an arrangement, a distortion of the signal waveform and a transmission delay occur between the network terminal equipment I and the terminal equipment 6. Assume that a round trip delay larger than a prescribed value occurs also when the codecs 7 are used for encoding. In such an instance, the distortion of the signal waveform can be suppressed to the prescribed value of Recommendation I.430 through use of the existing techniques such as the waveform reshaping circuit 2 and the amplifier 3. On the other hand, since the transmission delay cannot be removed by the existing techniques, an up-signal frame and a down-signal frame do not correctly correspond to each other in the terminal equipment, making D-channel access control impossible. With the use of the adapter 5 according to the present invention, however, D-channel access control between the pieces of terminal equipment 6 can also be effected.

Figure 7:
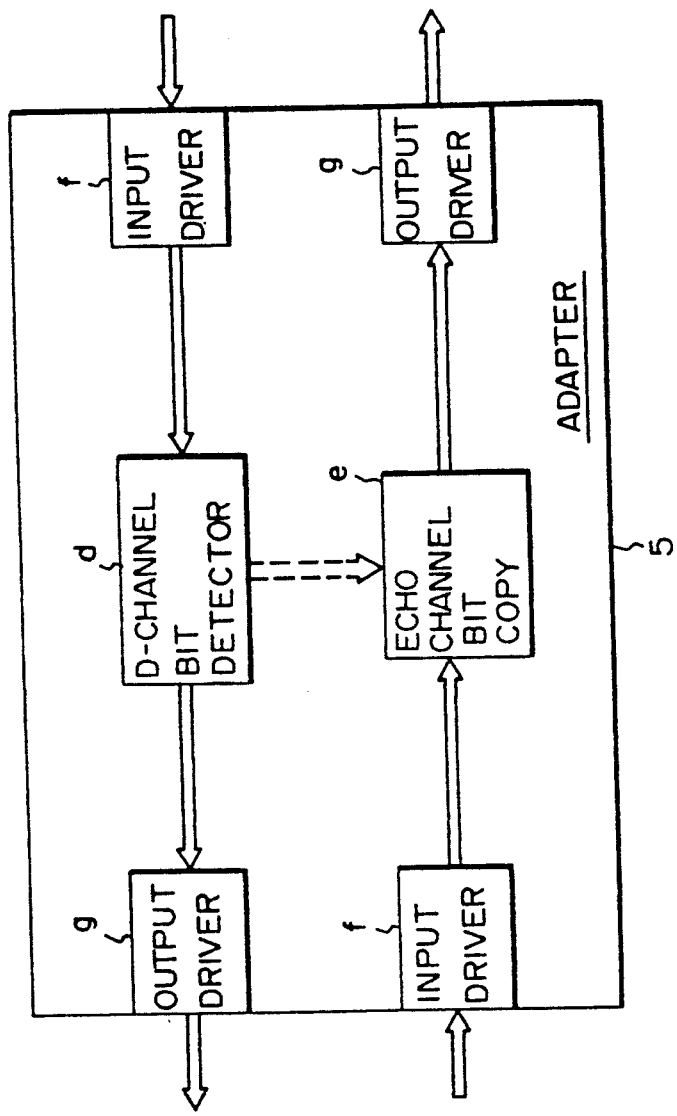
FIG. 7 is a block diagram of an adapter for use in the present invention.
Figure 9:
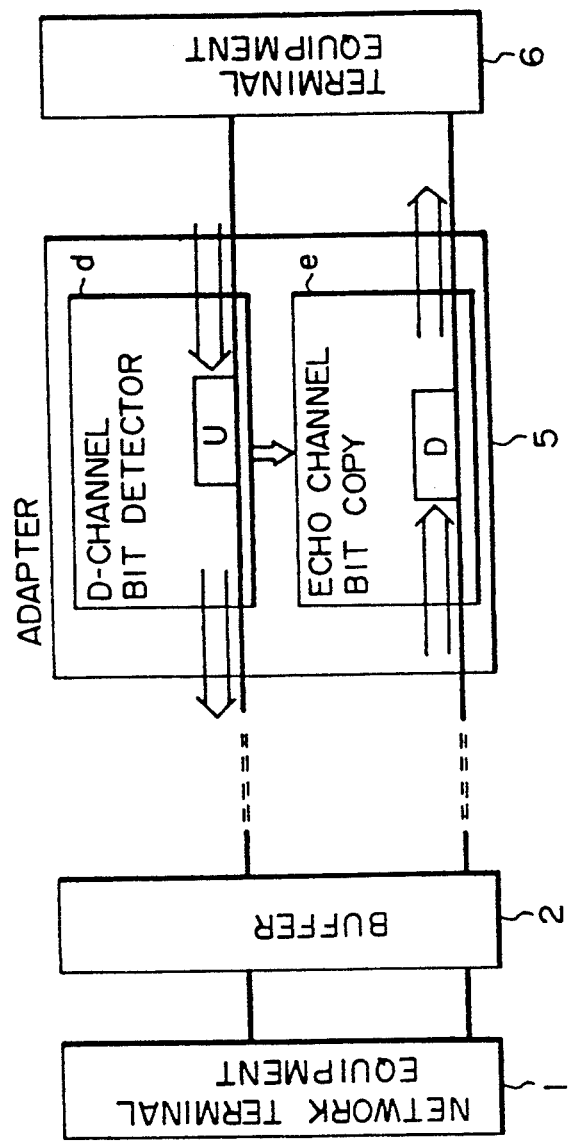
FIG. 9 is an operation diagram of the adapter for use in the present invention.

A description will be given of the functional block of the adapter 5 for use in the present invention and processing of each functional part. FIG. 7 is a functional block diagram of the adapter 5 and FIG. 9 its functional operation diagram. The adapter 5 comprises a D-channel bit detector d, an echo channel bit copy e, input drivers f and output drivers q. In the adapter 5, the D-channel bit detector d detects a D-channel bits in the up-signal frame transmitted from terminal equipment. The detected D-channel bits are transmitted to the echo channel bit copy e, wherein they are copied into echo channel bits in the down-signal frame transmitted from the input driver f.

The above is the operation procedure of the adapter 5 for use in the present invention. Next, a description will be given of processing of signal frames between the network terminal equipment 1 and the terminal equipment 6 in a case where the adapter 5 is employed.

Assume that an n-frame transmission time is consumed from the time when an up-signal frame is transmitted from the terminal equipment 6 to the time when the up-signal is received by the network terminal 1 and a down-signal frame frame having the D-channel bits in the received up-signal frame copied into the echo channel bits is transmitted from the network terminal equipment 1 and then received by the terminal equipment 6. In this instance, the down-signal frame which the terminal equipment 6 receives immediately after the transmission therefrom of an up-signal frame UFi is a down-signal frame DFi-n corresponding to an up-signal frame UFi-n transmitted n frames earlier. Accordingly, the echo channel bits of the down-signal frame DFi-n have copied thereinto the D-channel bits x of the up-signal frame UFi-n. Upon receiving the up-signal frame UFi, the adapter 5 detects the D-channel bits y in the frame and copies the D-channel bits y into the echo channel bits of the down-signal frame DFi-n which the adapter 5 receives immediately after the up-signal frame. By this operation, the D-channel bits y of the up-signal frame UFi and the echo channel bits of the down-signal frame DFi-n correspond to each other in the terminal equipment 6, permitting the D-channel access control.

With the use of the adapter 5 according to the present invention, the D-channel access control can be effected, even if the up-signal frame and down-signal frame do not correctly correspond to each other in the terminal equipment 6.

Embodiment 3

Figure 5:
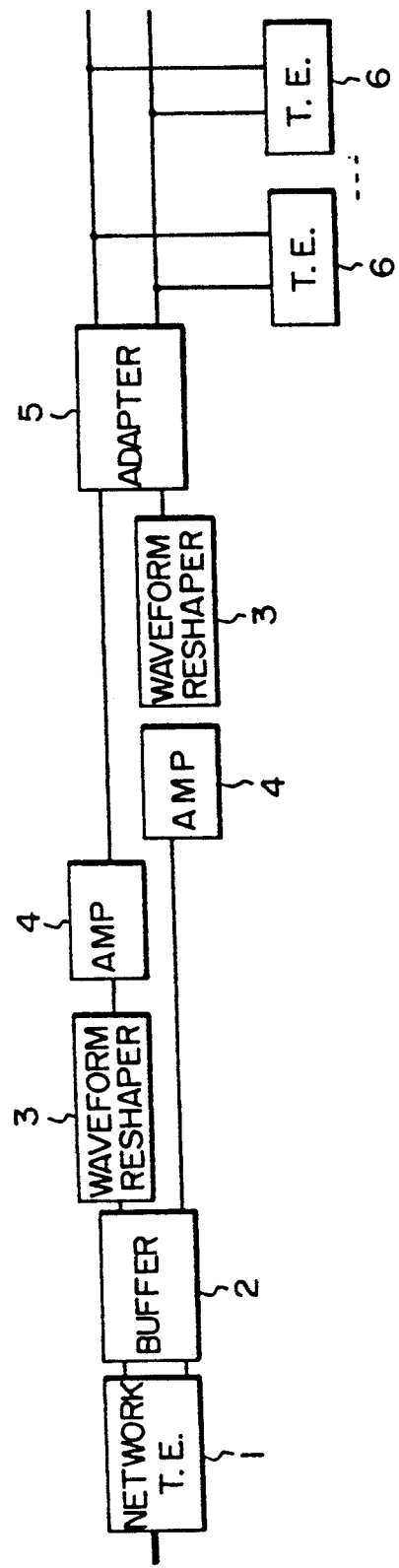
FIG. 5 is a connection diagram of a network terminal equipment and terminal equipments in accordance with still another embodiment of the present invention.

FIG. 5 is a block diagram illustrating the connection of network terminal equipment and terminal equipments which employ extension devices (a buffer and an adapter) in accordance wity the present invention. Reference numeral 1 denotes network terminal equipment, 2 a buffer, 3 a waveform reshaping circuit, 4 amplifiers, 5 an adapter, and 6 terminal equipments. They are interconnected by a four-wire transmission line, respectively. Let it be assumed that a distance between the network terminal equipment 1 and the terminal equipment 6 is longer than the distance prescribed by Recommendation I.430 and that a distance between the network terminal equipment 1 and the buffer 2 and between the adapter 5 and the terminal equipment 6 are distances over which the electrical characteristics prescribed by Recommendation I.430 can be retained. With such an arrangement, a distortion of the signal waveform and a transmission delay occur between the network terminal equipment 1 and the terminal equipment 6. The distortion of the signal waveform can be suppressed to the value prescribed by Recommendation I.430 through utilization of the existing techniques such as the waveform reshaping circuit 3 and the amplifiers 4. Further, troubles resulting from the transmission delay can be eliminated by the use of the buffer 2 and the adapter 5 according to the present invention. Hence, processing for communication between the network terminal equipment 1 and the terminal equipment 6 can be performed through use of the buffer 2 and the adapter 5 according to the present invention, together with the waveform reshaping circuit 3 and the amplifiers 4.

Figure 10:
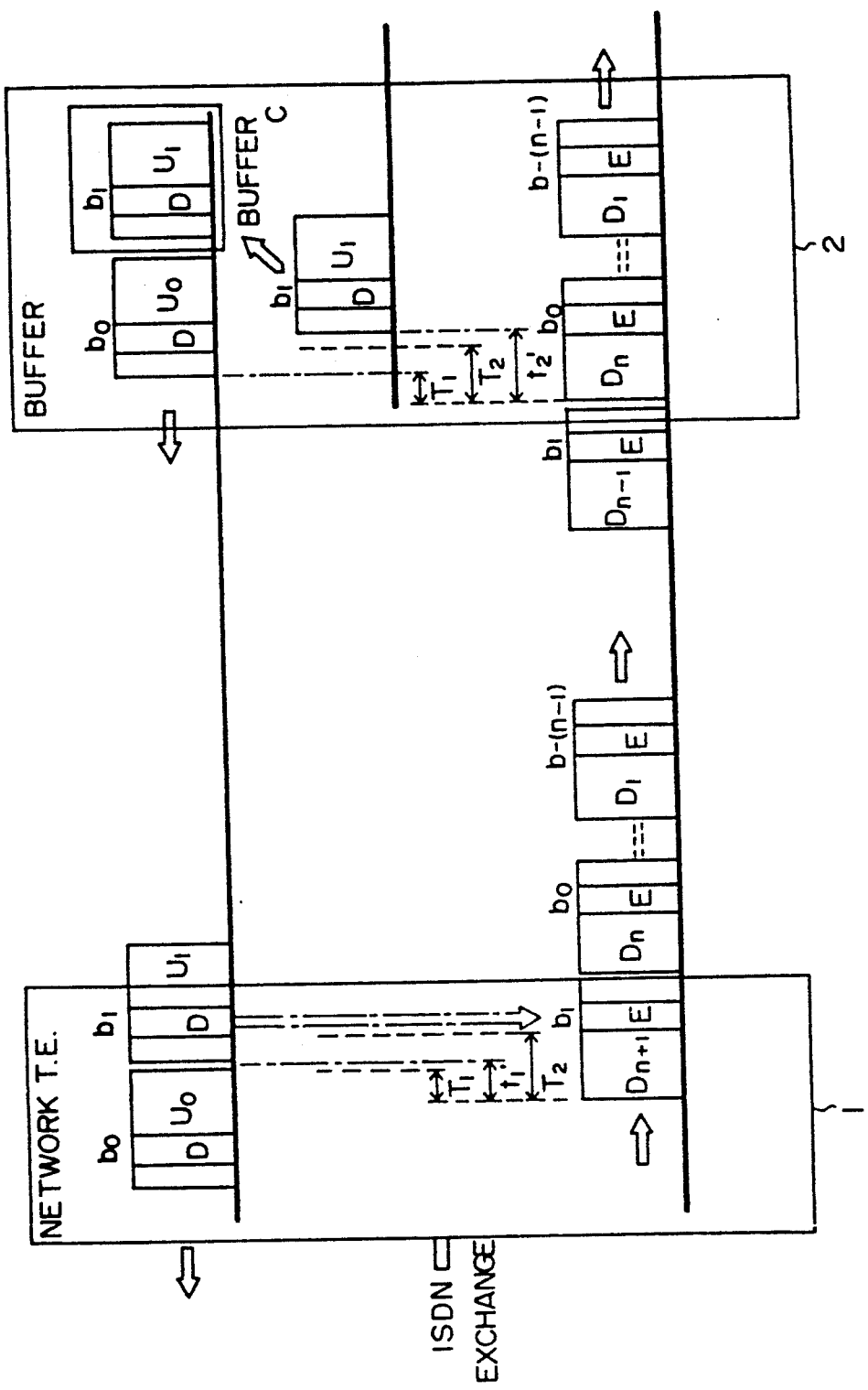
FIG. 10 is a diagram showing the relationship between signal frames in the network terminal equipment and the terminal equipments embodying the present invention.
Figure 11:
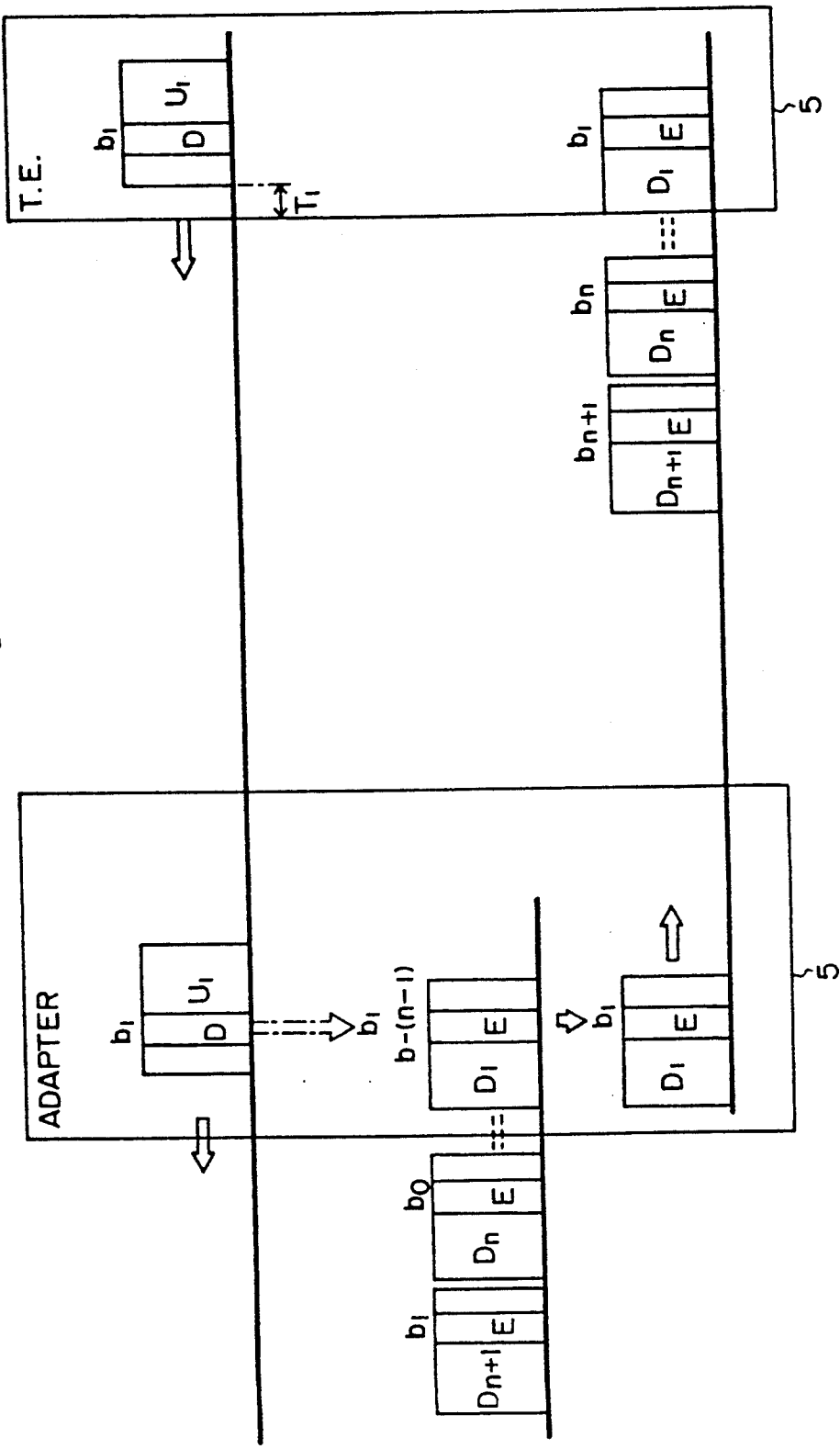
FIG. 11 is a diagram showing the relationship between signal frames in the network terminal equipment and the terminal equipments embodying the present invention.

A description will be given, with reference to FIGS. 10 and 11, of the operations of the buffer 2 and the adapter 5.

Assume that a round trip delay time in the network terminal equipment 1 is longer than $(T_2+250\times n)$ microseconds but shorter than $(T_1+250\times(n+1))$ microseconds. As shown in FIG. 10, the network terminal equipment 1 transmits a down-signal frame D1 and the terminal equipment 6 transmits an up-signal frame U1 after receiving the down-signal frame D1. Since the up-signal frame U1 is received by the network terminal equipment 1 more than $(T_2+250\times n)$ microseconds after the transmission of the down-signal frame D1, n down-signal frames D2, ..., Dn (n=3, 4, 5, ...) have already been transmitted. It is to be understood n and n are the same quantities. Consequently, the up-signal frame U1 is received during the transmission of the down-signal frame Dn. Assuming that the time from the start of transmission of the down-signal frame Dn to the reception of the up-signal frame U1 is $t_1'$ microseconds, then $T_2<t_1'<(T_1+250)$, and consequently, the network terminal equipment 1 cannot detect the synchronization of the up-signal frame U1. With the use of the buffer 2 according to the present invention, however, it is possible to detect the synchronization of the up-signal frame in the network terminal equipment 1 as depicted in FIG. 10. Let the time from the start of transmission of the down-signal frame Dn from the network terminal equipment 1 to the adapter 5 to the reception of the up-signal frame U1 be represented by $t_2'$ microseconds, the time $t_2'$ may sometimes become $T_2<t_1'<(T_1+250)$ in the network terminal equipment 1 even if $T_2<t_2'<(T_1+250)$ or $T_1<t_2'\leq T_2$. In either case, the buffer 2 stores the up-signal frame U1 in the frame buffer c and transmits the up-signal frame U1 at two-bit offset timing with respect to the reception of a down-signal frame Dn+1 which is transmitted from the network terminal equipment 1. Then, in the network terminal equipment 1 frame bits of the up-signal frame U1 are received with a delay of $(T_1+250)\leq t_1'\leq(T_2+250)$ after the transmission of frame bits of the down-signal frame Dn+1. This permits the detection of synchronization of the up-signal frame U1.

Moreover, a shift of the correspondence between the up-signal and down-signal frames occurs in the terminal equipment 6. In the network terminal equipment 1 the D-channel bits in the up-signal frame U1 are copied into the echo channel bit in the down-signal frame Dn+1. Consequently, the down-signal frame Dn+1 with the D-channel bits of the up-signal frame U1 copied therein are received by the terminal equipment 6 in an n-th frame after the transmission therefrom of the up-signal frame U1. The echo channel bits in the down-signal frame D1, which are received by the terminal equipment 6 during the transmission therefrom of the up-signal frame U1, have copied thereinto the D-channel bits in an up-signal frame U-(n−1) transmitted n frames earlier than the up-signal frame U1. In the terminal equipment 6, however, the echo channel bits in the down-signal frame D1 are regarded as having copied thereinto the D-channel bits in the up-signal frame U1, and therefore, access control for the D-channel cannot be effected. To avoid this, the present invention employs the adapter 5. The adapter 5 detects the D-channel bits in the up-signal frame U1 transmitted from the terminal equipment 6 and copies the detected D-channel bits into the echo channel bits in the received down-signal frame D2 prior to its transmission to the terminal equipment 6. By this processing, the D-channel bits in the up-signal frame and the echo channel bits in the down-signal frame correspond to each other in the terminal equipment 6, permitting the D-channel access control.

With the use of the extension devices (the buffer 2 and the adapter 5) according to the present invention, it is possible to increase a distance between the network terminal equipment 1 and the terminal equipment 6 in excess of the prescribed value of Recommendation I.430.

Embodiment 4

Figure 12:
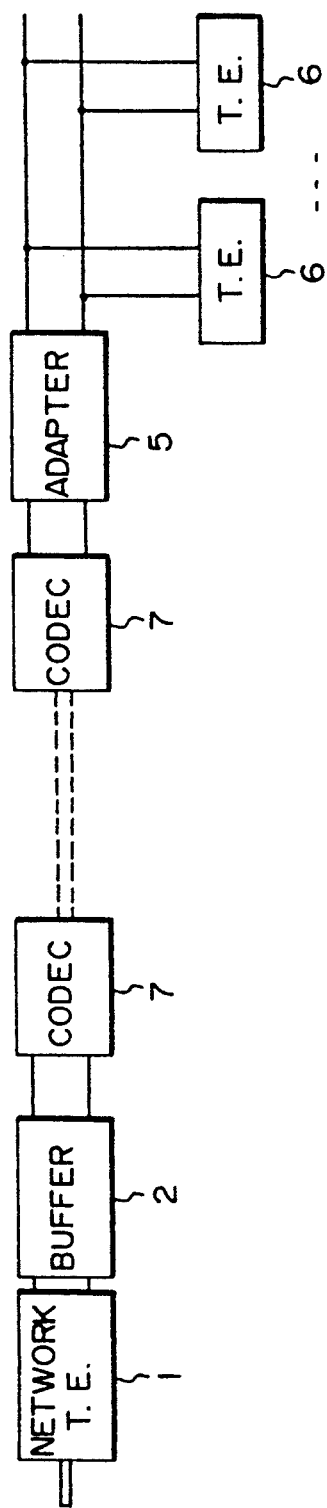

FIG. 12 is a block diagram illustrating the connection of network terminal equipment and terminal equipments which employ the extension devices according to the present invention. Reference numeral 1 denotes network terminal equipment, 2 a buffer, 5 an adapter, 6 terminal equipments, and 7 codecs. They are interconnected by a four-wire transmission line, respectively. Let it be assumed that a distance between the adapter 5 and the terminal equipment 6 is a distance over which the electrical characteristics prescribed by Recommendation I.430 can be retained. The codecs 7 are each a device for converting the signal aspect in accordance with the transmission line used and include a digital modem or the like. Between the codecs 7 the up-signal frame and the down-signal frame are transmitted in an encoded form corresponding to the type of the codecs. In a case where the transmission line between the codecs 7 is a satellite communication line or the like, however, there is the possibility that the round trip delay between the network terminal equipment 1 and the terminal equipment 6 becomes larger than the prescribed value of Recommendation I.430 owing to the encoding and transmission. In such a case, the detection of synchronization of the up-signal frame in the network terminal equipment 1 and a shift in the correspondence between the up-signal frame and the down-signal frames in the terminal equipment 6 pose problems. As described above, however, these problems can be solved by using the buffer 2 and the adapter 5 which possess the function of the extension device.

With the use of the extension devices (the buffer 2 and the adapter 5) according to the present invention, arbitrary encoding can be performed between the network terminal equipment 1 and the terminal equipment 6.

Embodiment 5

Figure 13:
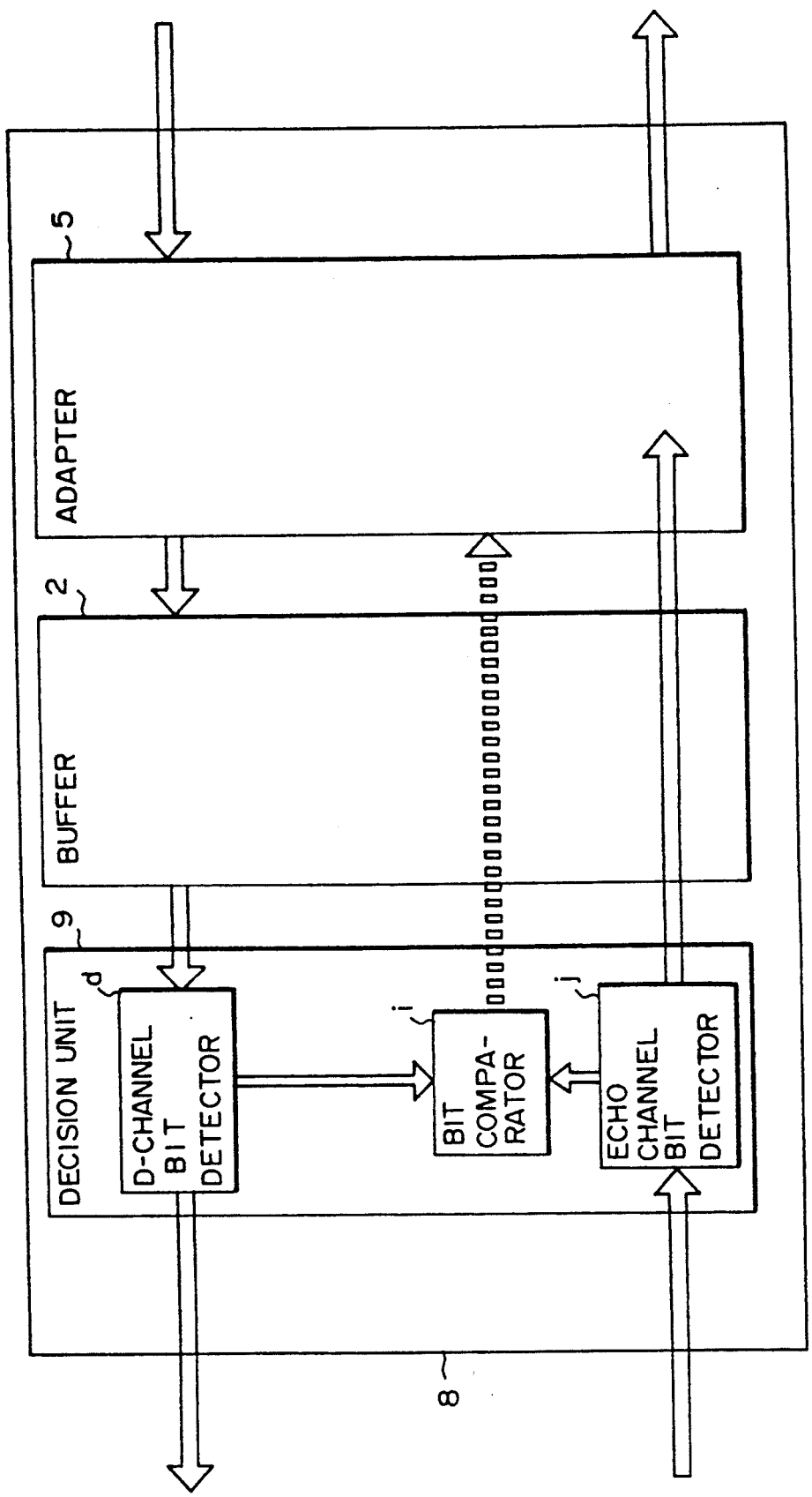
FIG. 13 is a block diagram of a repeater in accordance with the present invention.

FIG. 13 is a block diagram of a repeater according to the present invention. Reference numeral 9 denotes a decision unit, 2 a buffer, 5 an adapter, d a D-channel bit detector, i a bit comparator and j an echo channel bit detector. The buffer 2, the adapter 5 and the D-channel bit detector d operate in the same manner as described previously in respect of Embodiments 1 to 3.

An up-signal frame transmitted from the terminal equipment is received in the adapter 5, wherein the D-channel bits in the up-signal frame is detected and copied into the echo channel bits in the down-signal frame which is sent to the terminal equipment. The up-signal frame having the D-channel bits detected is sent to the buffer 2 and stored therein. The buffer 2 sends out the stored up-signal frame in accordance with the timing of receiving the down-signal frame. The up-signal frame sent out of the buffer 2 is received by the decision unit 9. In the decision unit 9 the D-channel bit detector d detects the D-channel bits in the received up-signal frame and transmits the bit information to the bit comparator i. The down-signal frame sent out of the network terminal equipment is received by the decision unit 9, wherein its echo channel bits are detected by the echo channel bit detector j. The information on the thus detected echo channel bits is transmitted to the bit comparator i, wherein the D-channel bits in the up-signal frame and the echo channel bits in the down-signal frame are compared with each other. The result of comparison by the bit comparator i is provided to the adapter 5. The adapter 5 controls the copying process of the D-channel bits in accordance with the result of comparison. In a case where the D-channel bits and the echo channel bits are equal to each other in the decision unit 9, copying of the D-channel bits in the up-signal frame into the echo channel bits in the down-signal frame is continued, but when the D-channel bits and the echo channel bits differ from each other, the copying process is stopped. The above is the processing of each functional block in the repeater according to the present invention.

Figure 14:
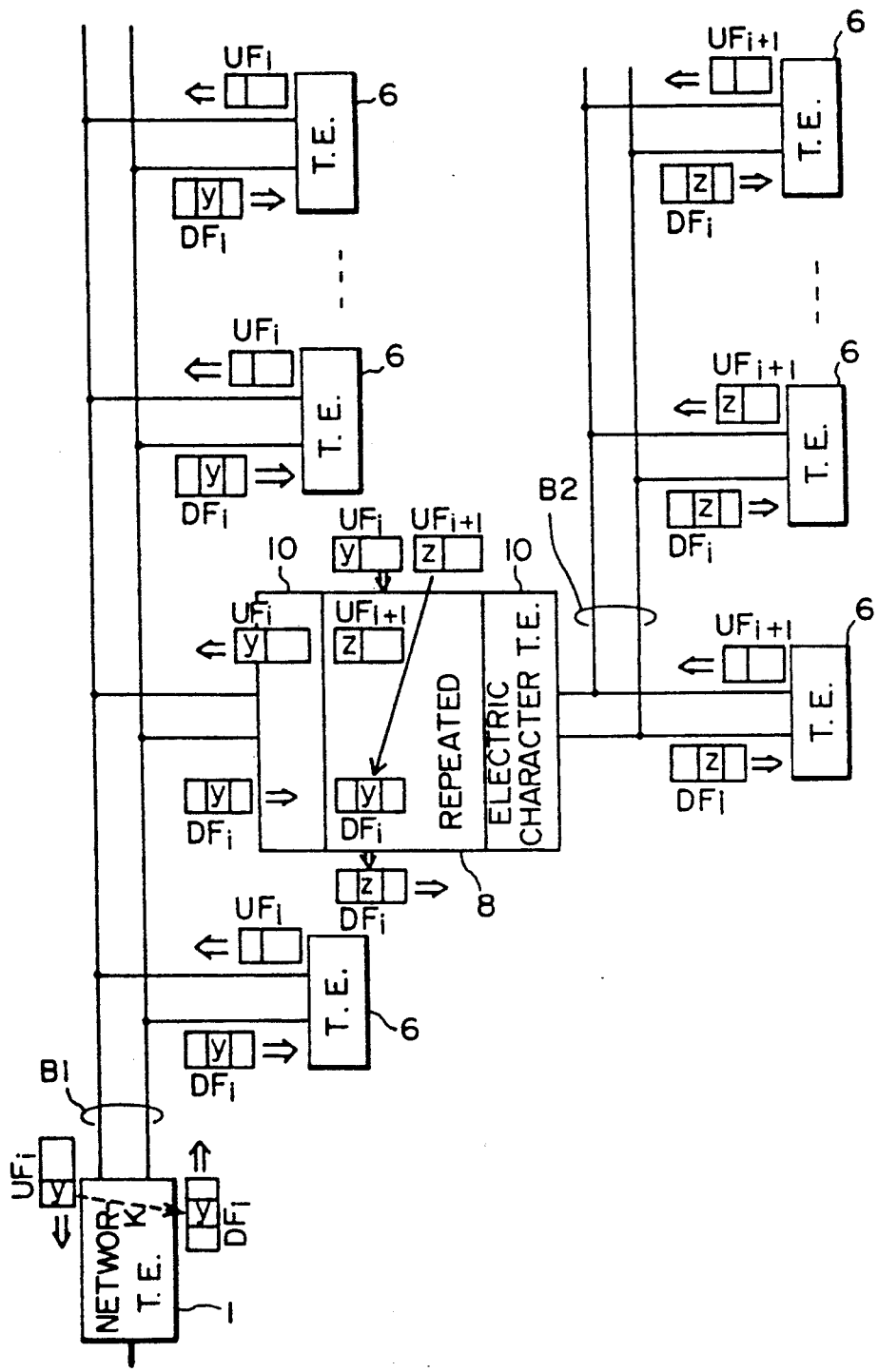
FIG. 14 is a connection diagram of a network terminal equipment and terminal equipments in accordance with another embodiment of the present invention.

Next, a description will be given of the relationship of signal frames between the network terminal equipment and the terminal equipment in a case where the repeater is used. FIG. 14 is a block diagram illustrating the connection of network terminal equipment and terminal equipments which employ the repeater according to the present invention. Reference numeral 1 indicates network terminal equipment, 6 terminal equipments, 8 a repeater, and 10 electrical characteristic terminal equipments. They are interconnected by a four-wire transmission line, respectively. The bus directly connected to the network terminal equipment is B1 and the bus connected via the repeater 8 to the bus B1 is B2. A distance between each of the terminal equipments 6 on the bus B1 and the repeater 8 and the network terminal equipment is within the range of the prescribed value of Recommendation I.430. A distance between the terminal equipments 6 on the bus B2 and the repeater 2 is shorter than the distance between the network terminal equipment and the terminal equipment prescribed by Recommendation I.430. The electrical characteristic terminal equipment, interposed between the bus B1 and the repeater 8, is a device which terminates so that the repeater 8, as viewed from the bus B1, provides the prescribed electrical characteristics of Recommendation I.430 as is the case with the terminal equipment 6. The electrical characteristic terminal equipment 10, interposed between the bus B2 and the repeater 8, is a device which terminates so that the repeater 8, as viewed from the bus B2, provides the prescribed electrical characteristics of Recommendation I.430 as is the case with the network terminal equipment 1. In this instance, the electrical characteristics prescribed by Recommendation I.430 can be retained in each bus, but there is the possibility that a round trip delay larger than the prescribed value occurs between the network terminal equipment 1 and the terminal equipment 6 on the bus B2. Even in a case where a round trip delay greater than the prescribed value of Recommendation I.430 occurs, however, the network terminal equipment 1 and the terminal equipment 6 can be interconnected through utilization of the repeater 8 according to the present invention.

The repeater 8 effects D-channel access control among terminal equipments on the bus B1. In a case where the repeater 8 is selected in access control on the bus B1, the terminal equipment 6 selected by the D-channel access control on the buse B2 is connected to the network terminal equipment 1. When any one of terminal equipments 6 is selected by the access control on the bus B1, any of the terminal equipments 6 on the bus B2 cannot be connected to the network terminal equipment 1. In such a case, the terminal equipments 6 on the bus B2 have to stop the transmission of the up-signal frame. On this account, the repeater 8 stops copying of the D-channel bits in the up-signal frame into the echo channel bits in the down-signal frame and transmits the down-signal frame intact from the network terminal equipment 1 to the bus B2. In the terminal equipment 6 on the bus B2 having received the down-signal frame intact from the network terminal equipment 1, since the D-channel bits in the up-signal frame and the echo channel bits in the down-signal frame do not match with each other, it is decided that the terminal equipment 6 has not been selected by the D-channel access control, and the signal transmission from the terminal equipment 6 is stopped. In the buffer 2 of the repeater 8 there is stored the up-signal frame, but the signal frame is erased. The repeater 8, which has stopped the transmission of the signal frame, and the terminal equipment 6 on the bus B2 receive the down-signal frame from the network terminal equipment 1 and monitor the echo channel bit, and hence are capable of detecting the state of use of the D channel of the bus B1. The repeater 8 monitors the state of use of the D channel of the bus B1 by the decision unit 9 and, upon detection of the D channel being idle, instructs the adapter 5 to copy the D-channel bits in the up-signal frame into the echo channel bits in the down-signal frame and to transmit an intra-buffer signal frame to the buffer 2. By repeating the above operation, the detection of frame synchronization in the network terminal equipment 1 at the time of the buses being interconnected and the D-channel access control among the pieces of terminal equipment 6 are implemented.

The use of the repeater 8 according to the present invention permits the interconnection of the buses B1 and B2.

Embodiment 6

Figure 15:
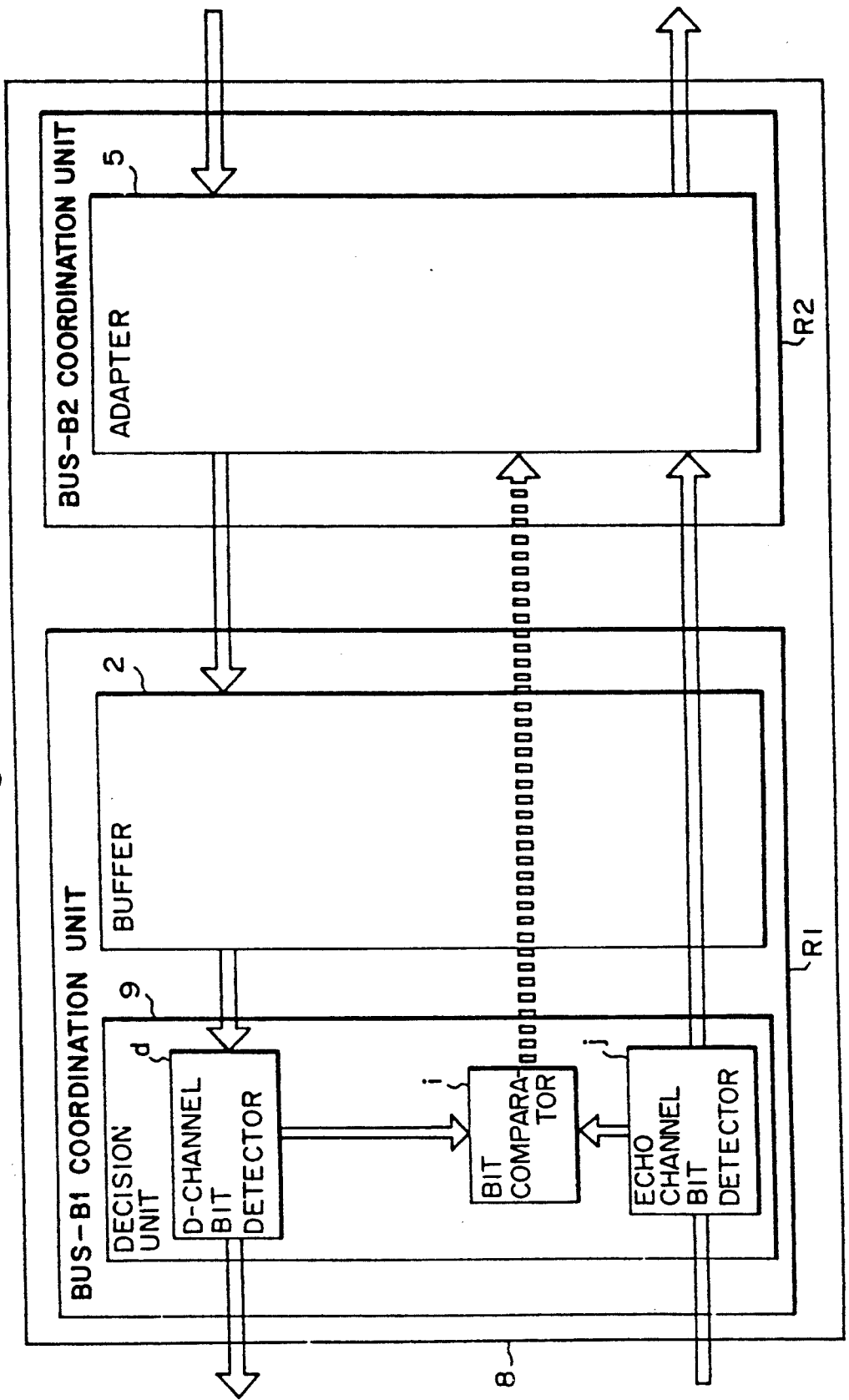
FIG. 15 is a block diagram of a repeater in accordance with the present invention.
Figure 16:
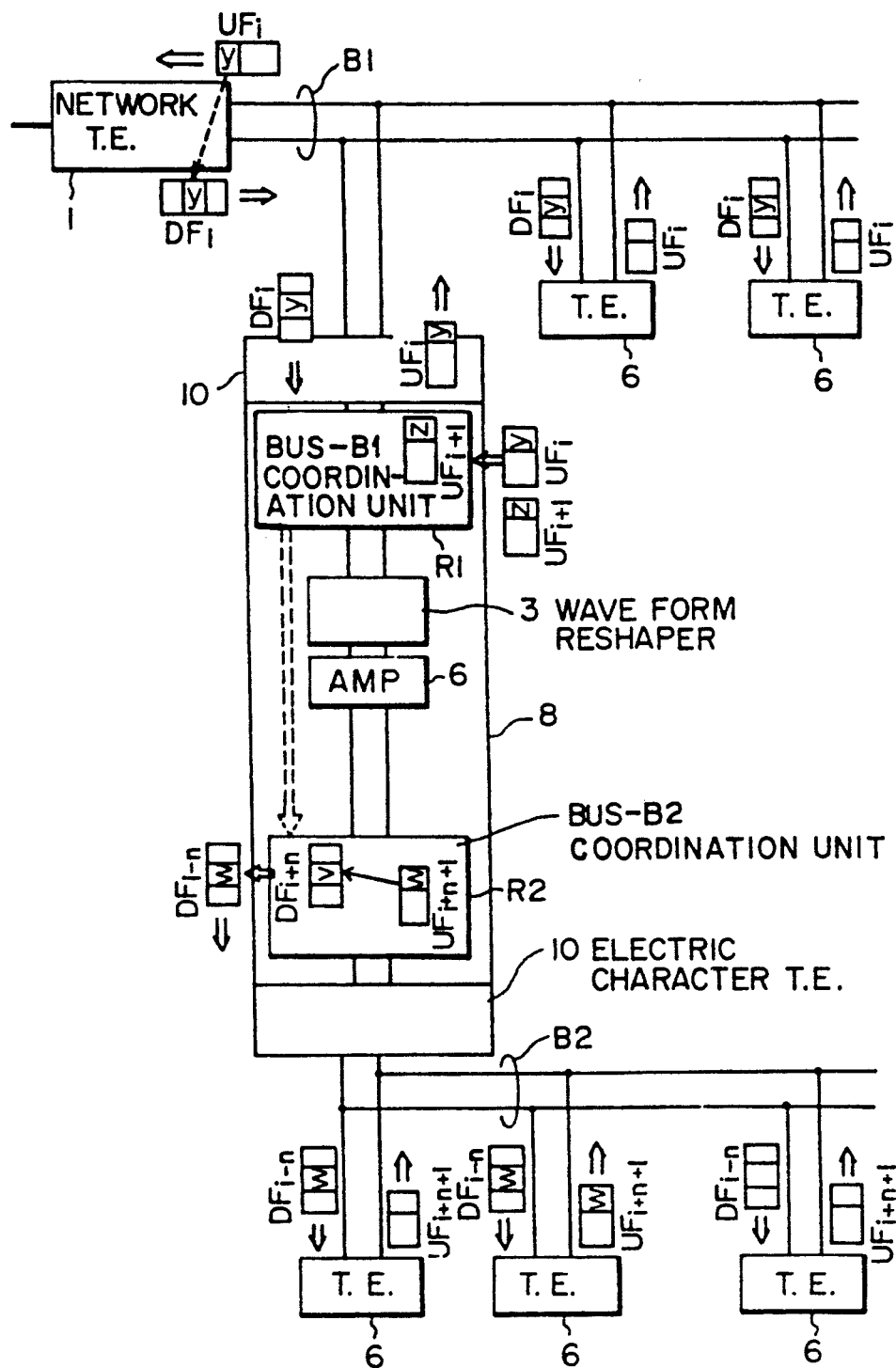
FIG. 16 is a connection diagram of a network terminal equipment and terminal equipments in accordance with still a further embodiment of the present invention.

FIG. 15 is a block diagram of the repeater 8 divided into two, i.e. a bus-B1 coordination unit R1 composed of the decision unit 9 and the buffer 5 and a bus-B2 coordination unit R2 composed of the adapter 5. Between the bus-B1 coordination unit R1 and the bus-B2 coordination unit R2 the up-signal frame, the down-signal frame and the result of decision by the decision unit 9 are transmitted. FIG. 16 shows the connection between the network terminal equipment 1 and the terminal equipments 6 in a case where the line between the bus-B1 and bus-B2 coordination units R1 and R2 is extended. A distance between the buses B1 and B2 is within the range of the prescribed value of Recommendation I.430, but since the line between the bus-B1 and bus-B2 coordination units R1 and R2 is extended, a distance between the network terminal equipment 1 and the terminal equipment 6 on the bus B2 is larger than the prescribed value. This causes a distortion of the signal waveform and a round trip delay between the network terminal equipment 1 and the terminal equipment 6 on the bus B2 in excess of the prescribed values. The problem of the distortion of the signal waveform is solved by the application of the existing techniques such as the waveform reshaping circuit 5 and the amplifier 6. The problem of the transmission delay is solved by the application of the repeater 8 according to the present invention. The operation of the repeater 8 will hereinbelow be described.

The operation of each functional block in the repeater 8 is the same as that described previously with respect to Embodiment 5, but the round trip delay time between the bus-B1 and bus-B2 coordination units R1 and R2 corresponds to the time for the round-trip of n signal frames. Accordingly, when the up-signal frame UFi is received in the network terminal equipment 1, the terminal equipment 6 on the bus B2 is transmitting an up-signal frame UFi+n+1 (n+1) frames after the up-signal frame UFi. When the network terminal 1 transmits the down-signal frame DFi, the terminal equipment 6 on the bus B2 is receiving a down-signal frame DFi-n n frames earlier than the down-signal frame DFi. That is, the terminal equipment 6 on the bus B2 receives the down-signal frame DFi-n immediately after transmitting the up-signal frame UFi+n+1. Even if a shift occurs in the correspondence between the signal frames in the bus B2, the adapter in the bus-B2 coordination unit R2 copies the D-channel bits of the up-signal frame UFi+n+1 into the echo channel bits of the down-signal frame DF-i, and hence the D-channel access control can be effected. Moreover, the bus-B1 coordination unit R1 effects D-channel access control among the terminal equipments on the bus B1. The decision unit 9 compares the D-channel bits of the up-signal frame with the echo channel bits of the down-signal frame and indicates the result of comparison to the buffer 2 and the adapter 5. When the D-channel bits of the up-signal frame and the echo channel bits of the down-signal frame are the same, the buffer 2 transmits the up-signal frame. The adapter 5 copies the D-channel bits of the up-signal frame into the echo channel bits of the down-signal frame. When it is decided by the decision unit 9 that the D-channel bits of the up-signal frame does not match with the echo channel bits of the down-signal frame, the buffer 2 erases the up-signal frame in the buffer, whereas the adapter 5 stops copying the D-channel bits of the up-signal frame into the echo channel bits of the down-signal frame. While the decision unit 9 in the bus-B1 coordination unit R1 compares the up-signal frame UFi with the down-signal frame DFi, the adapter 5 in the bus-B2 coordination unit R2 copies the D-channel bits of the up-signal frame UFi+n+1 into the echo channel bits of the down-signal frame DFi-n. On this account, even if it is determined in the bus-B1 coordination unit R1 that the transmission of the up-signal frame be discontinued, the bus-B2 coordination unit R2 has already transmitted n up-signal frames, and consequently, the bus-B1 coordination unit R1 will receive the n up-signal frames after stopping the signal frame transmission. The n up-signal frames received after stopping the transmission are erased in the buffer 2. In the bus-B1 coordination unit R1, no signal is transmitted from the bus-B2 coordination unit R2 after the reception of the n up-signal frames, and at this point the discontinuation of the transmission of the signal frames from the repeater 8 and the terminal equipment 6 on the bus B2 is completed. In a case where the terminal equipment 6 on the bus B2 detects an idle state of the D channel of the bus B1 and originates a call again, the decision unit 9 of the bus-B1 coordination unit R1 detects the idle state of the D channel of the bus B1 and indicates it to the adapter 5 in the bus-B2 coordination unit R2 and the buffer 2. Upon receiving the information, the adapter 5 copies the D-channel bit of the up-signal frame transmitted from the terminal equipment 6 on the bus B2 into the echo channel bits of the down-signal frame. The buffer 2 stores the up-signal frame and controls the transmission timing. Thus, the D-channel access control on the buses B1 and B2 is effected.

The use of the repeater 8 according to the present invention permits the extension of the line between the buses B1 and B2 and their interconnection.

Embodiment 7

Figure 17:
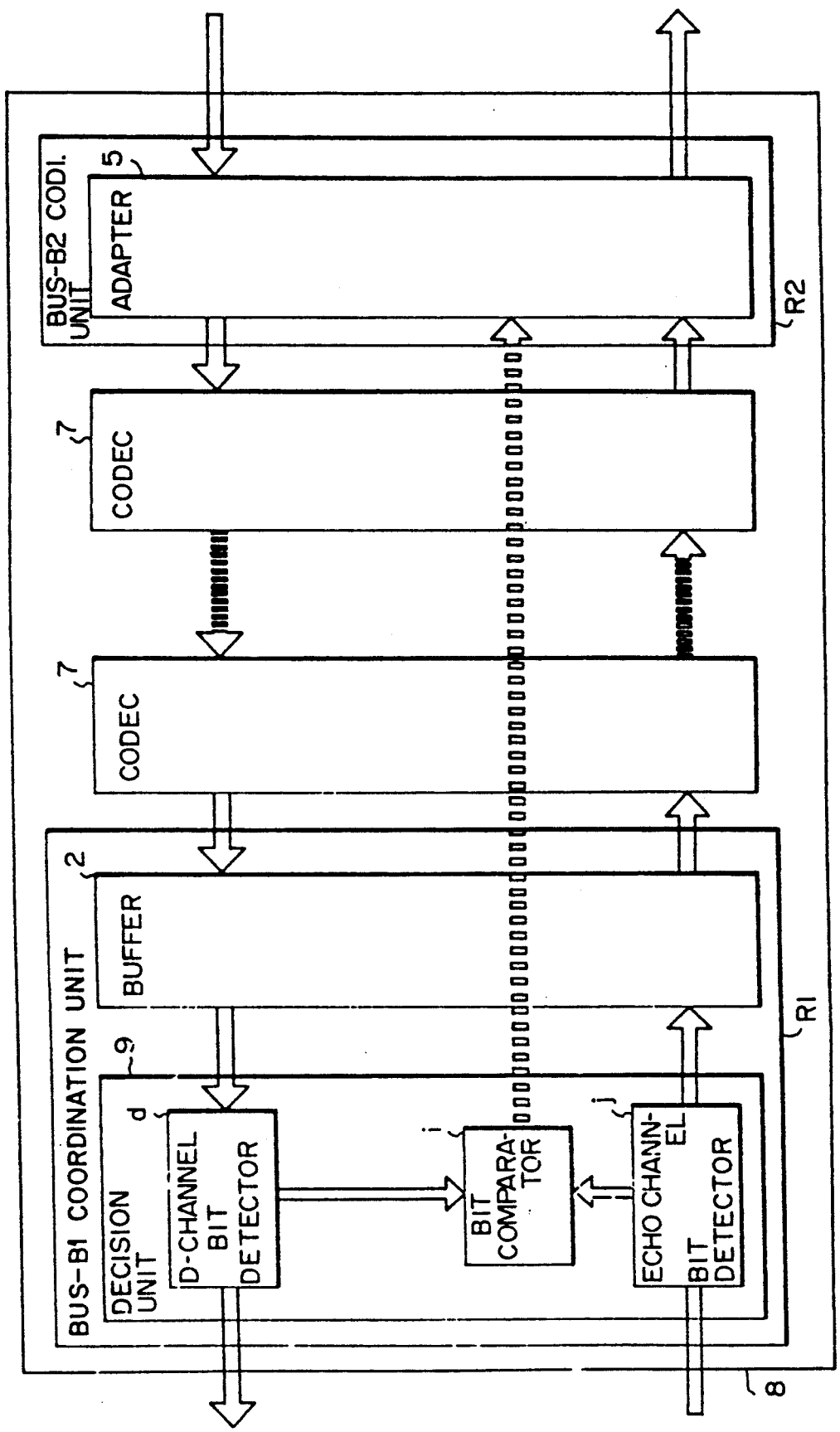
FIG. 17 is a block diagram of a repeater in accordance with the present invention.

FIG. 17 is a block diagram in a case where the signal frames which are transmitted and received between the bus-B1 and B2 coordination units R1 and R2 are transmitted in an encoded form. A pair of codecs 7 are provided in the transmission line between the bus-B1 and B2 coordination units R1 and R2 and an up-signal frame and a down-signal frame are transmitted using encoded signals corresponding to the codecs 7. The codecs 7 are each a device for converting the signal aspect in accordance with the transmission line used and include a digital modem or the like as well. The operation of each functional block is the same as that described previously with reference to Embodiment 5. The result of decision by the decision unit 9 is transmitted directly over a dedicated transmission line or encoded between the codecs 7 and transmitted together with the up-signal frame and the down-signal frame.

In a case of a system wherein each codec 7 needs a relatively long time for establishment of synchronization like a modem for a satellite communication line, the system starting time will increase if an INFO0 signal at the starting time is transmitted using an asynchronous signal between the codecs 7. In such a system, the starting time can be reduced by transmitting all the information on the INFO signal as synchronization signals.

As described above, according to the present invention, even if the round trip delay between a network terminal equipment and a terminal equipment is larger than the prescribed value of Recommendation I.430, it is possible to detect the synchronization of an up-signal frame in the network terminal equipment and to effect D-channel access control among terminal equipments, thus implementing the extension of the transmission line between the network terminal equipment and the terminal equipment and encoding therebetween.

What we claim is:

1. An ISDN user-network interface system comprising:
    an interface buffer provided between an ISDN network terminal equipment and a terminal equipment to receive an up-signal frame transmitted from said terminal equipment to said interface buffer, to store said up-signal frame, and to transmit said stored up-signal frame at a timing when said network terminal equipment is capable of detecting the synchronization of said up-signal frame; and
    an interface adapter provided between said ISDN network terminal equipment and said terminal equipment, to receive an up-signal frame transmitted from said terminal equipment to said interface adapter, to detect D-channel bits of said up-signal frame, to transmit said up-signal frame to said network terminal equipment, to copy said detected D-channel bits into an echo channel bits of a down-signal frame from said net-work terminal equipment to said interface adapter received immediately after the transmission of said up-signal frame, and to transmit said down-signal frame to said terminal equipment.

2. An ISDN user-network interface system according to claim 1, in which said interface buffer comprises:
    a first input driver for receiving a down-signal from the ISDN network terminal equipment
    a second input driver for receiving an up-signal transmitted from the ISDN terminal equipment;
    a buffer for temporarily storing the frame of said up-signal received by said second input driver;
    a frame synchronization detector for detecting the synchronization frame timing of said down-signal received by said first input driver;
    a buffer controller for effecting control so that said up-signal temporarily stored in said buffer is read out therefrom at two-bit offset timing with respect to said detected synchronization frame timing;
    a first output driver for transmitting to said network terminal equipment said up-signal read out of said buffer; and
    a second output driver for sending out said down-signal received by said first input driver to said network terminal equipment.

3. An ISDN user-network interface system according to claim 1, in which said interface adapter comprises:
    a first input driver for receiving an up-signal from the ISDN terminal equipment;
    a second input driver for receiving a down-signal transmitted from the ISDN network terminal equipment;
    a D-channel bit detector for detecting D-channel bits from said up-signal received by said first input driver;
    an echo channel bit copy for copying said detected D-channel bits into an echo channel bits of said down signal received by said second input driver;
    a first output driver for outputting said down-signal from said echo channel bit copy to said terminal equipment; and
    a second output driver for outputting said up-signal received by said first input driver to said network terminal equipment.

4. An ISDN user-network interface system according to claim 1, further comprising:
    a decision unit provided between the ISDN network terminal equipment and the terminal equipment, for deciding the presence or absence of the right for access to a D-channel by comparing D-channel bits of an up-signal frame to be transmitted from said terminal equipment with echo channel bits of a down-signal frame to be received from said network terminal equipment, thereby to provide an ISDN user-network repeater for repeating said up-signal frame and said down signal frame.

* * * * *